(12) United States Patent
Otte (10) Patent No.: US 11,713,226 B1
(45) Date of Patent: Aug. 1, 2023

(54) LIFTING DEVICE FOR TOWABLE IRRIGATION TOWERS

(71) Applicant: Edward E. Otte, Canton, MO (US)

(72) Inventor: Edward E. Otte, Canton, MO (US)

(*) Notice: Subject to any disclaimer, the term of this patent is extended or adjusted under 35 U.S.C. 154(b) by 126 days.

(21) Appl. No.: 17/468,889

(22) Filed: Sep. 8, 2021

(51) Int. Cl.
*B66F 3/24* (2006.01)
*B66F 3/36* (2006.01)
*B62J 11/22* (2020.01)

(52) U.S. Cl.
CPC ............... *B66F 3/245* (2013.01); *B62J 11/22* (2020.02); *B66F 3/36* (2013.01)

(58) Field of Classification Search
CPC .... B66F 3/245; B66F 3/36; B66F 3/22; B66F 3/247; B66F 7/0641; B66F 7/06; B66F 7/08; B66F 7/085; B66F 2700/12; B66F 2700/126; B60S 11/00; B60S 13/00
See application file for complete search history.

(56) References Cited

U.S. PATENT DOCUMENTS

| 5,110,090 | A | 5/1992 | Mcduffie |
| 6,312,210 | B1 | 11/2001 | Lang |
| 7,544,030 | B2 * | 6/2009 | Fast ...................... A01B 59/008 414/24.5 |
| 9,327,947 | B2 | 5/2016 | Davis |
| 9,598,271 | B2 | 3/2017 | Kritzer |
| 10,160,395 | B2 | 12/2018 | Robinson et al. |
| 2008/0149420 | A1 * | 6/2008 | Cheatham ................. B60R 9/06 182/63.1 |
| 2010/0320431 | A1 | 12/2010 | Upton et al. |
| 2016/0038240 | A1 | 2/2016 | Guerrero |

* cited by examiner

*Primary Examiner* — Tyrone V Hall, Jr.
*Assistant Examiner* — Abbie E Quann
(74) *Attorney, Agent, or Firm* — Grace J. Fishel (57) ABSTRACT

A lifting device for use in lifting towable irrigation towers mounted on an all terrain vehicle (ATV). The lifting device having a support frame fitted beneath the ATV, a parallelogram linkage attached to the support frame operable with a hydraulic cylinder between a collapsed and upright position with saddles on an upper rail for lifting an axle of the tower such that the tower wheels can be rotated, a winch for raising and lowering the support frame and a suspension limiter for stopping movement of the support frame in the up position such that the frame does not damage the underside of the ATV.

8 Claims, 8 Drawing Sheets

LIFTING DEVICE FOR TOWABLE IRRIGATION TOWERS

BACKGROUND OF THE INVENTION

Field of the Invention

The present invention relates to a device attached to an all terrain vehicle for lifting the tower axles of a towable center pivot irrigation system such that the wheels on each tower may be pivoted perpendicular to the axle. The device has a wide base such that it may be used in a muddy field.

Brief Description of the Prior Art

Towable center pivot irrigation systems include a central pivot, at least one irrigation pipe extending out from the central pivot, and one or more motorized wheeled towers. The motorized wheeled towers are coupled to the central pivot via the irrigation pipe such that as the motorized wheeled towers move, the pipe revolves around the central pivot. During such rotation the wheels are generally parallel to the tower axles.

Towable center pivot irrigation systems make irrigation more economical because the system can be used to irrigate a number of different parcels. To move the system, the tower must be jacked up by the axle such the wheels are above the ground and can be rotated perpendicular to the axle for towing. When the system has just finished irrigating another parcel, the ground around the towers may be soft and muddy and the wheels may be depressed in ruts.

There are hand operated jacks for lifting a wheel on each side of the tower but the work is labor intensive. With fewer farmers operating larger amounts of land, time is in short supply. In addition hand operated jacks have a relatively small base are subject to slippage in a wet field. A hydraulic lifting device attached to a three-point support system of a tractor is described in U.S. Pat. No. 5,110,090 to McDuffie. While McDuffie's system appears to offer an advantage over a hand operated jack, an ATV with a lifting device mounted on the front of the vehicle is much more agile in a field and easier to align with a tower axle without backing. There are also jacks attached to each of the tower axles such as described in U.S. publication 2010/0320431 to Upton et al. but these systems are expensive and add weight on the tower axle.

BRIEF SUMMARY OF THE INVENTION

In view of the above, it is an object of the present invention to provide lifting device for towable irrigation towers that may be mounted on an ATV for more effective field use.

In accordance with the present invention a lifting device is attached to an all terrain vehicle (ATV) for lifting towable irrigation towers such that the wheels may be rotated into towing position. More particularly each of the towers is mounted on an axle with wheels that are movable between a first position perpendicular to the axle for rotation of the tower around a center pivot and a second position parallel with the axle for towing.

In an embodiment of the lifting device, a support frame with substantially parallel arms and a lug at a first end of each arm is attached to an underside of the ATV. A support platform is attached at a second end of the arms. The support frame is movable between a first position wherein the support frame is oriented substantially parallel to the ground and a second position wherein the support frame is lifted above the ground.

In other applications a parallelogram linkage mounted on the support platform with an upper rail and a lower rail and first and second support links. A hydraulic cylinder is positioned between the upper and lower rails. In some embodiments the rails are formed of C-shaped channel steel and the support links are formed of C-shaped channel steel with legs of the C-shaped channel support arms pivoted between legs of the C-shaped channel rails.

In most implementations the hydraulic cylinder has a base end and a pivot end connected with first and second pivot mounts between the upper and lower rails. The lower pivot mount is preferably positioned adjacent to and spaced inward from the support link connected to the lower rail and the upper pivot mount positioned adjacent to and spaced inward from the support link connected to the upper rail.

For use in lifting the axle of the tower, first and second C-shaped saddles are provided in some cases on the upper rail for cupping the axle of the tower and being spaced apart a distance sufficient to accommodate the drive shaft motor commonly located on the axle for driving the wheels.

In all examples the parallelogram linkage is movable by the hydraulic cylinder between a first position wherein the upper rail is below the axle of the tower so that the lifting device may be positioned below the axle and a second position wherein the upper rail is substantially parallel to the lower rail and spaced a distance by the support links above the lower rail sufficient that the C-shaped saddles raise the axle of the tower a distance that the wheels of the tower are lifted above the ground and may be rotated.

In some cases a winch mounted on the ATV with a cable attached to the support frame is provided for moving the support frame between the first and second positions. In those case, a suspension limiter may be provided for stopping movement of the support frame in the direction of the second position such that support frame does not contact the underside of the ATV.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

All terrain vehicles are popular recreational vehicles. However, given their ability to maneuver on a variety of terrains, ATV's have the potential to be adapted for practical applications such as described herein.

In a preferred embodiment, lifting device 10 provides an apparatus which may be attached to an all terrain vehicle (ATV) 12 for use in lifting towable irrigation towers 14. The lifting device includes a support frame 16 adapted to fit beneath ATV 12 in spaced apart relationship thereto, a parallelogram linkage 18 attached to support frame 16 at the front-end of the ATV and operable between a collapsed and upright position with a hydraulic cylinder 20, a winch 22 for raising and lowering support frame 16 and a suspension limiter 24 for stopping movement of the support frame in the up position such that the support frame does not damage the underside of the ATV.

Figure 1:
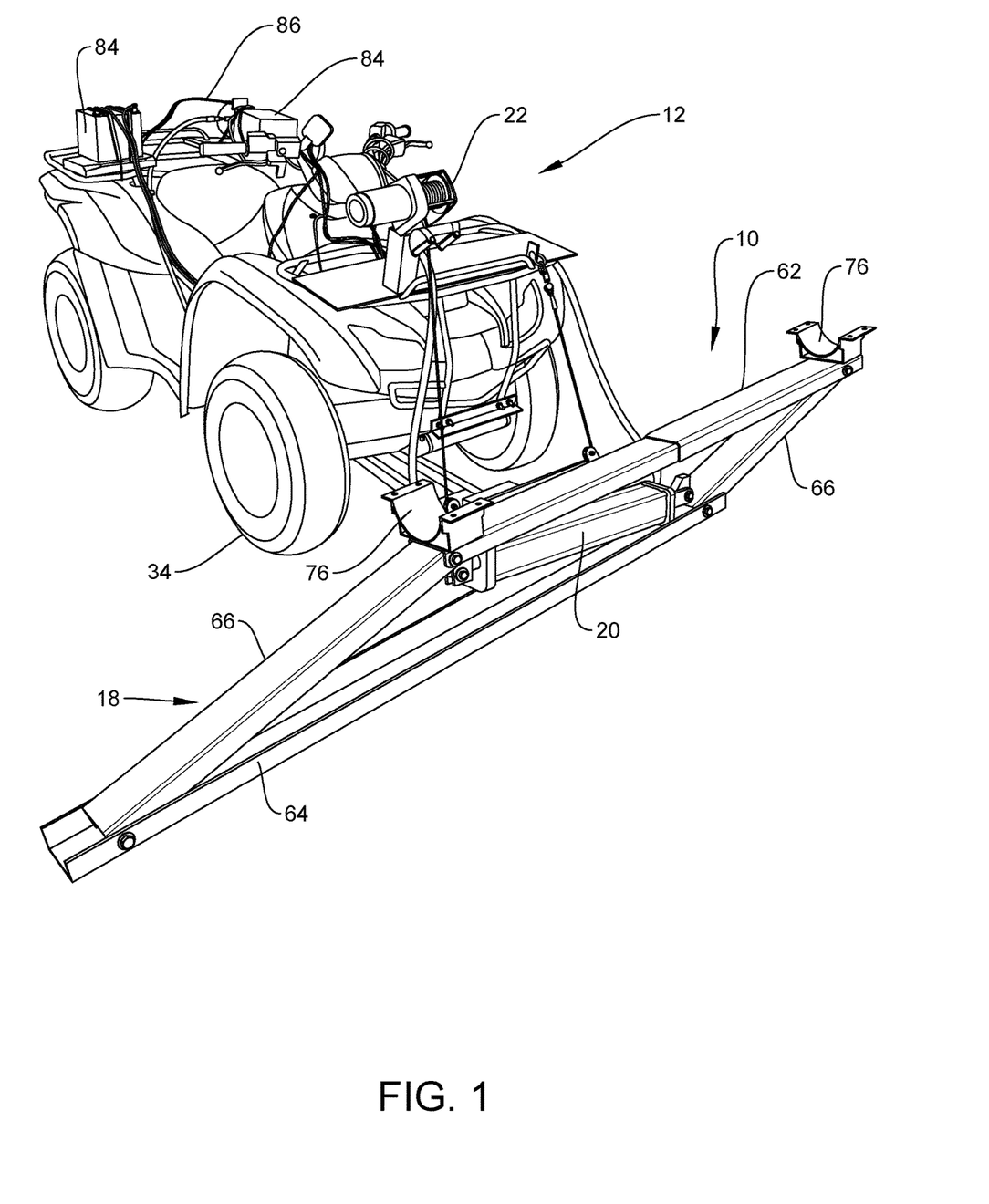
FIG. 1 is a front perspective view of a device for lifting a towable irrigation tower attached to an all terrain vehicle.
Figure 5:
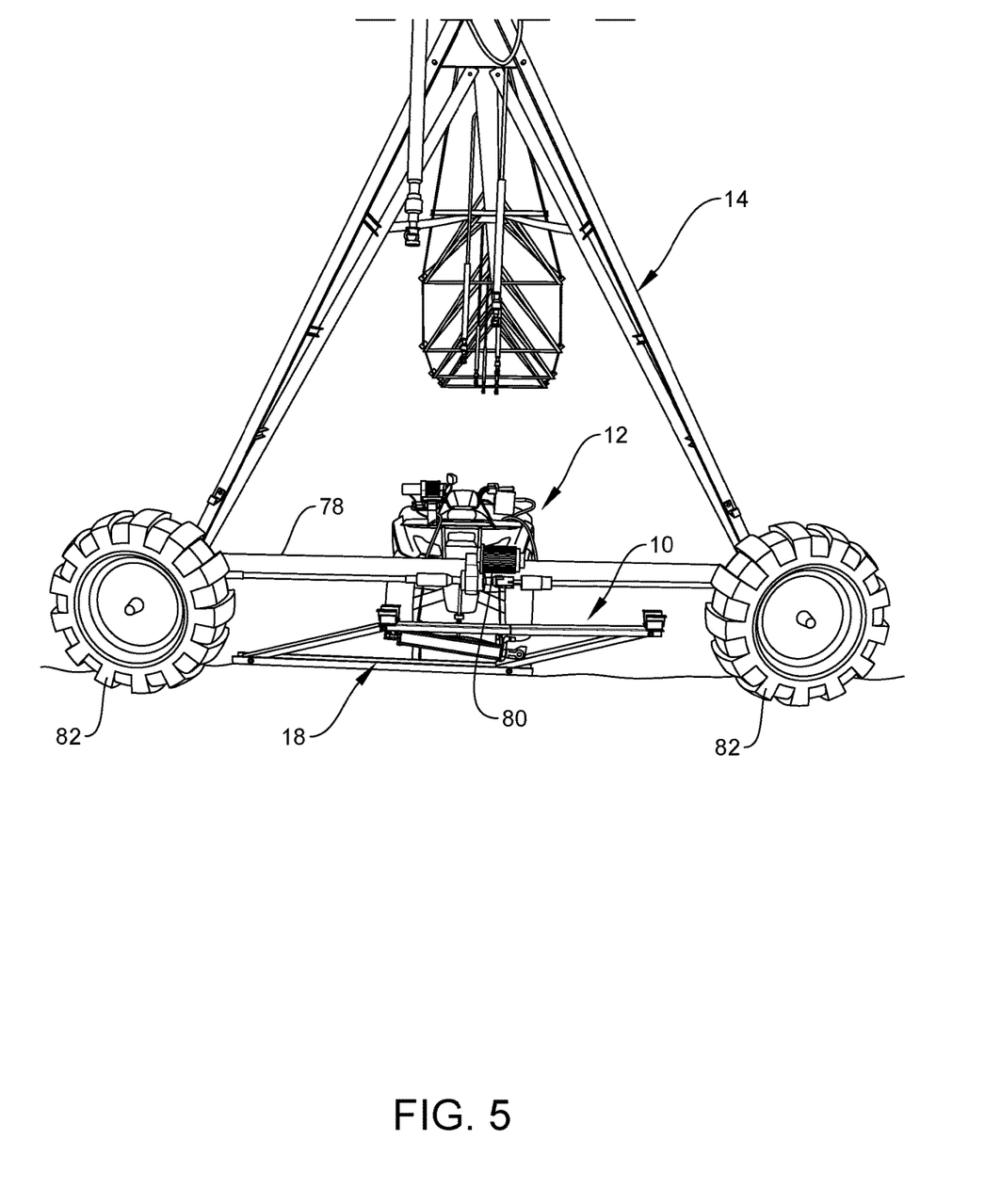
FIG. 5 is a front elevation of the lifting device in first folded position under an axle of the towable irrigation tower.
Figure 6:
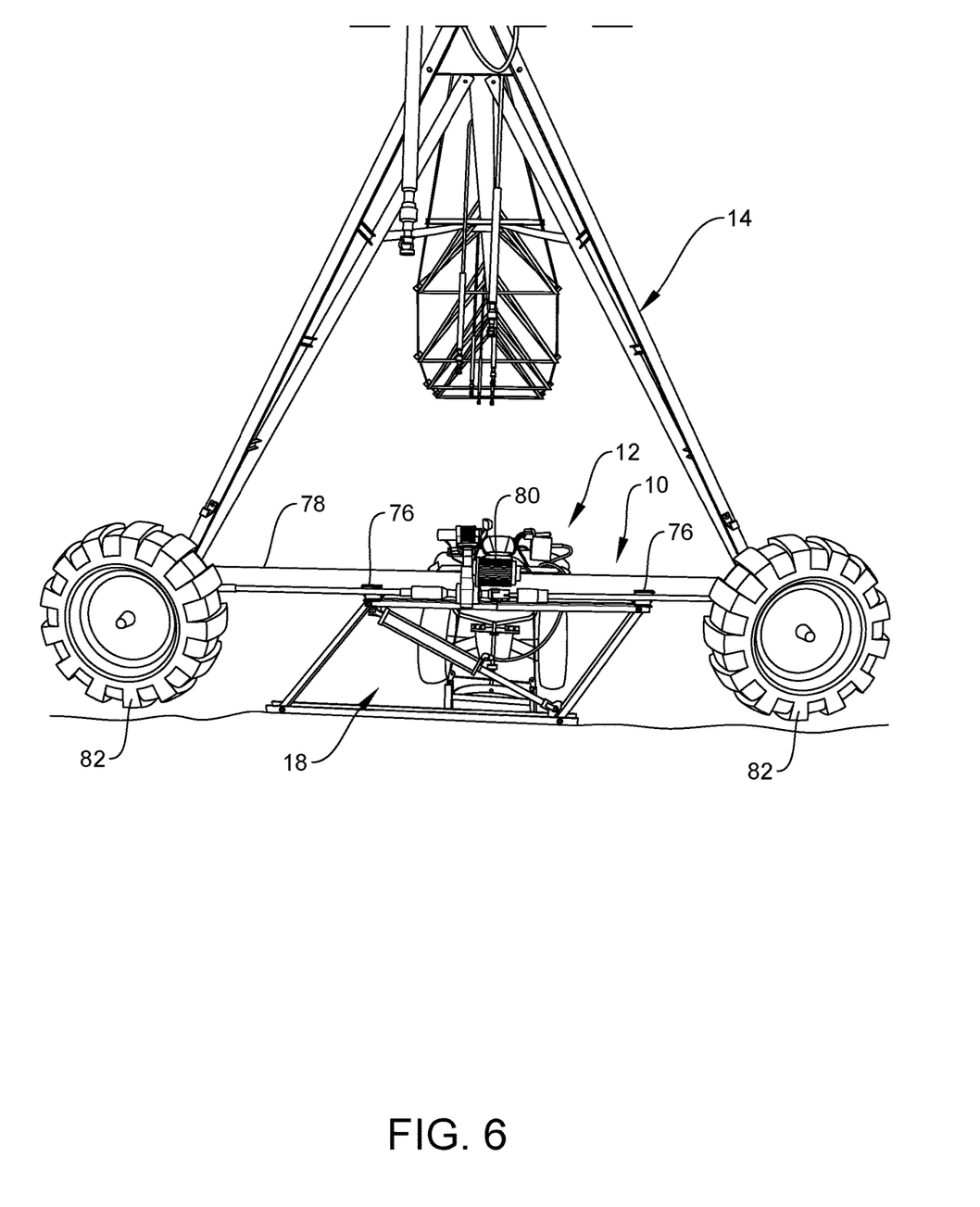
FIG. 6 is a front elevation of the lifting device in second unfolded position lifting the tower such that the wheels are off the ground.
Figure 7:
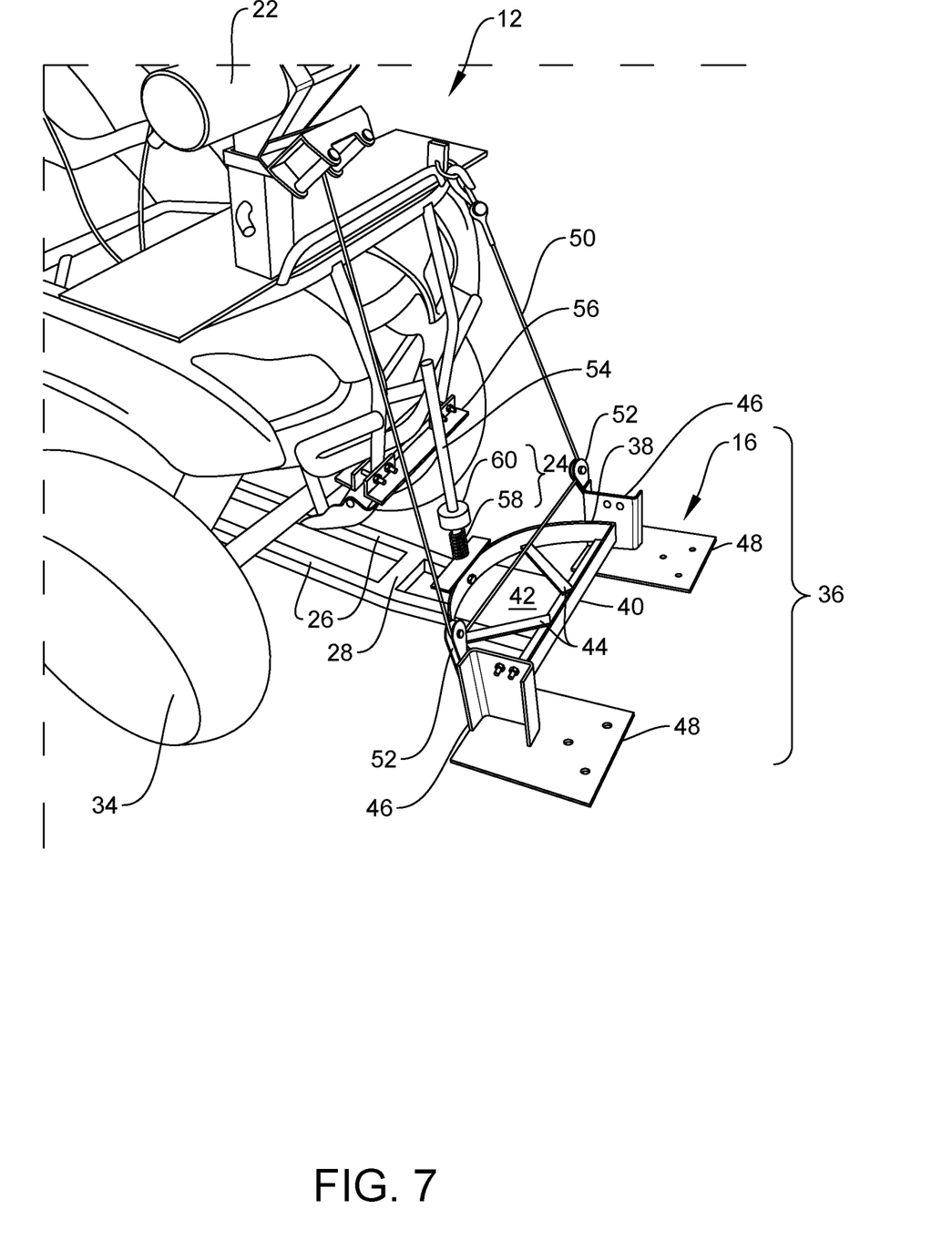
FIG. 7 is front perspective view of a support frame attached to the ATV on which the lifting device is mounted; and, FIG. 8 is detail showing arms of the support frame attached to a clevis mounted on an underside of the ATV.
Figure 8:
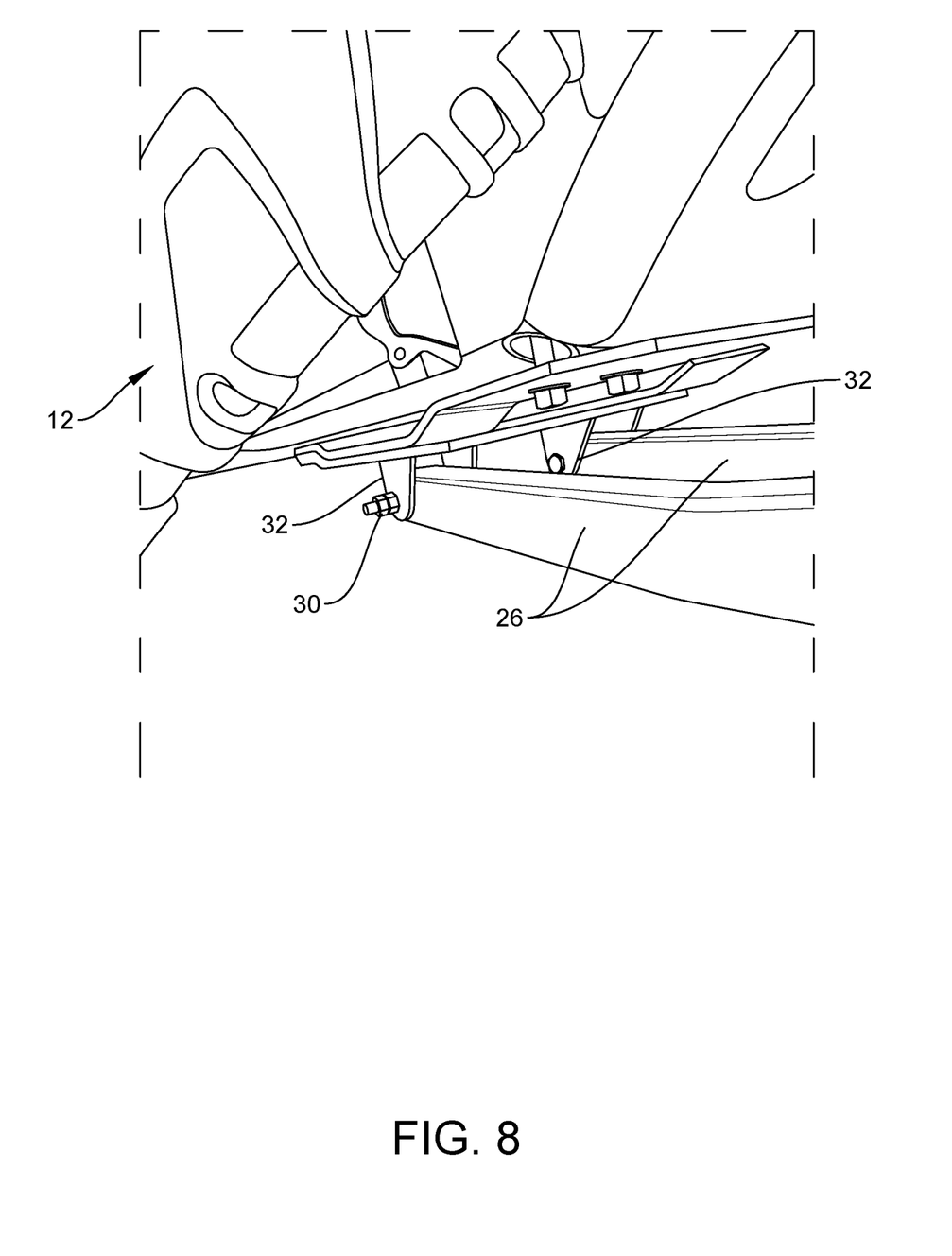

Referring to the drawings more particularly by reference character, lifting device 10 is shown mounted on ATV 12 as shown in FIG. 1. For use with towable irrigation tower 14 such as shown in FIGS. 5 and 6, it is desirable that lifting device 10 be relatively easy to install and remove when not in use such that the vehicle is available for other duty. For this purpose, as best seen in FIGS. 7 and 8, support frame 16 includes substantially parallel arms 26 formed of channel steel with at least one cross member 28 bridging between the arms for reinforcement. A first end of each arm 28 is connected by a pin or bolt 30 to a lug 32 in the form of a clevis attached to an underside of the ATV. A second end of each arm 26 extends forwardly between front wheels 34 of ATV 12 such that a platform 36 is positioned in front of the vehicle.

As shown in FIG. 7, platform 36 includes a semicircular rim 38 the ends of which are joined with a cross member 40 and mounted a base plate 42. Braces 44 interconnect rim 38 and cross member 40. Mounting uprights 46 formed of C-shaped steel channel are positioned vertically at the ends of cross member 40. Forwardly extending feet 48 are attached to a lower end of mounting uprights 46 to which parallelogram linkage 18 as described below is attached. It will be apparent that platform 36 which was retrofitted from a snow plow and may be simplified.

Winch 22 is attached to ATV 12 for raising and lowering support frame 16 in a substantially vertical plane relative to the ground. For this purpose a lifting cable 50 passes through a pulley 52 attached to each of mounting uprights 46 and to ATV 12. As lifting cable 50 is spooled on winch 22, the lifting cable pulls up on pulleys 52 and raises support frame 16 for transport.

Suspension limiter 24 stops movement of support frame 16 relative to the underside of ATV 12 beyond a preselected amount to prevent damage to the underside of the ATV. For this purpose a vertical guide rod 54 is attached to platform 36 and passed through an aperture in a bracket 56 attached to the ATV. A compression spring 58 with an inside diameter slightly more than the outside diameter of guide rod 54 is sandwiched between platform 35 and a collar 60 which is free to slide on guide rod 54. In the position shown in FIG. 7, compression spring 58 is not loaded. As support frame 16 is raised by winch 22 compression spring 58 pushes collar 60 up along guide rod 54 until collar 60 contacts the underside of bracket 56 at which point platform 36 and collar 60 are pressure plates at opposite ends of compression spring 58. Further upward movement of support frame 16 is stopped when the compressive force on compression spring 58 exceeds the pulling power of winch 22. To lower support frame 16 back down, compression spring 58 assisted by gravity biases support frame 16 towards the lowered position when the pull on lifting cable 50 is released by winch 22.

Figure 3:
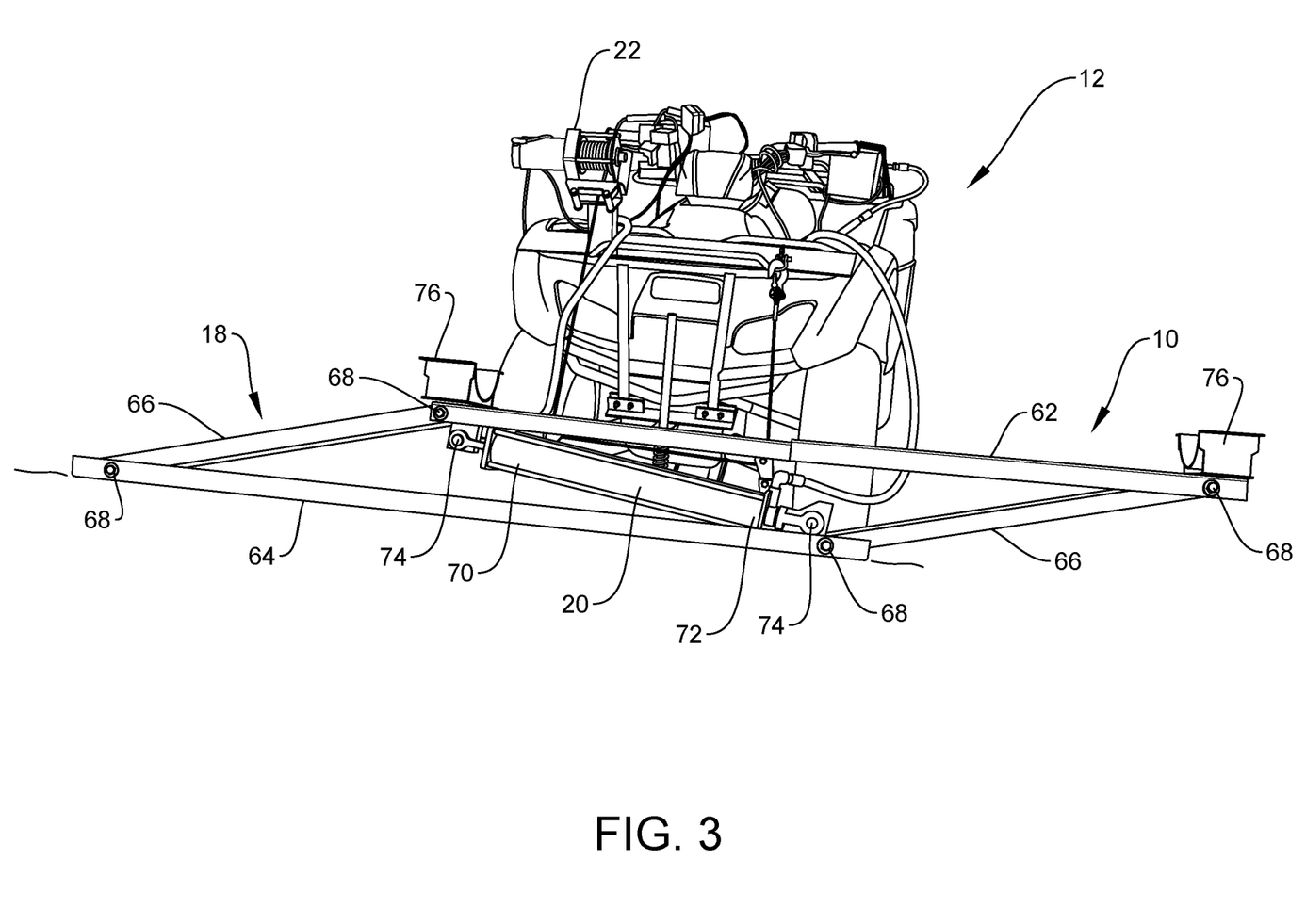
FIG. 3 is a front elevation of the lifting device in first folded position.
Figure 4:
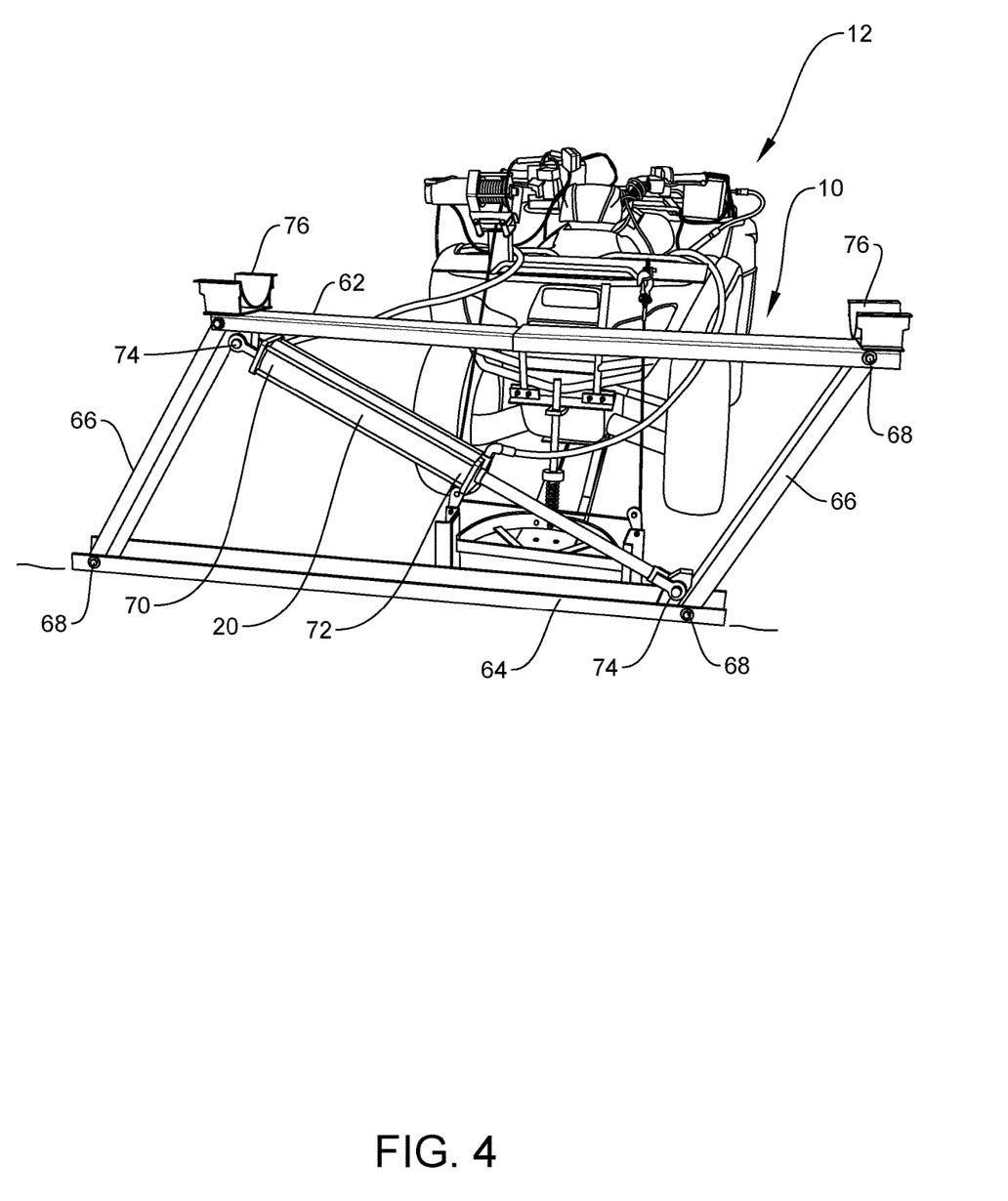
FIG. 4 is a front elevation of the lifting device in second unfolded position.

As best seen in FIGS. 3 and 4, parallelogram linkage 18 has an upper rail 62 and a lower rail 64 and parallel support links 66 which are connected with a pivot 68 at opposite ends to upper and lower rails 62, 64. Parallelogram linkage 18 is bolted or otherwise attached to forwardly extending feet 48 of platform 36 by lower rail 64 and is back braced against mounting uprights 46. As shown, upper and lower rails 62, 64 and support links 66 are formed of C-shaped channel steel with the legs of the C-shaped channel support links 66 pivoted between the legs of the C-shaped channel rails 62, 64. Hydraulic cylinder 20 with a base end 70 and a piston end 72 is connected with pivot mounts 74 between upper and lower rails 64, 66. Lower pivot mount 74 is positioned adjacent to and spaced inward from pivot 68 on lower rail 64 and upper pivot mount 74 is positioned adjacent to and spaced inward from pivot 68 on upper rail 62. First and second C-shaped saddles 76 have a concave circular depression adapted to embrace an axle 78 of towable irrigation towers 14. Saddles 76 are spaced apart a distance sufficient to accommodate a drive shaft motor 80 on the tower. Hydraulic cylinder 20 is preferably double acting but a single acting cylinder may be used in which case linkage 18 may be returned to collapsed condition by gravity after releasing the pressure on hydraulic cylinder 20.

Parallelogram linkage 18 is movable by hydraulic cylinder 20 between a first position wherein saddles 76 upper rail 62 are below axle 78 of tower 14 so that lifting device 10 may be positioned below axle 78 and a second position wherein upper rail 62 is substantially parallel to lower rail 64 and spaced a distance by support links 66 above lower rail 64 that saddles 76 raise axle 78 a distance that wheels 82 of tower 14 are lifted above the ground and may be rotated perpendicular to the tower. For this purpose when upper and lower rails 62, 64 are 77" long, support links 66 are 34" long and hydraulic cylinder 20 has a stroke of 58", parallelogram linkage 18 has a height of 10" when collapsed and a height of 33" when extended. With the collapsed height as shown in FIGS. 3 and 5, it is possible to position parallelogram linkage 18 under axle 78 of most towers even in a muddy field. With a base of 77" inches and an extended height of 33" as shown in FIGS. 4 and 6 it has been found that wheels 82 of most towers, even if sunk in mud ruts, will be raised high enough above the ground such that the wheels can be rotated.

Figure 2:
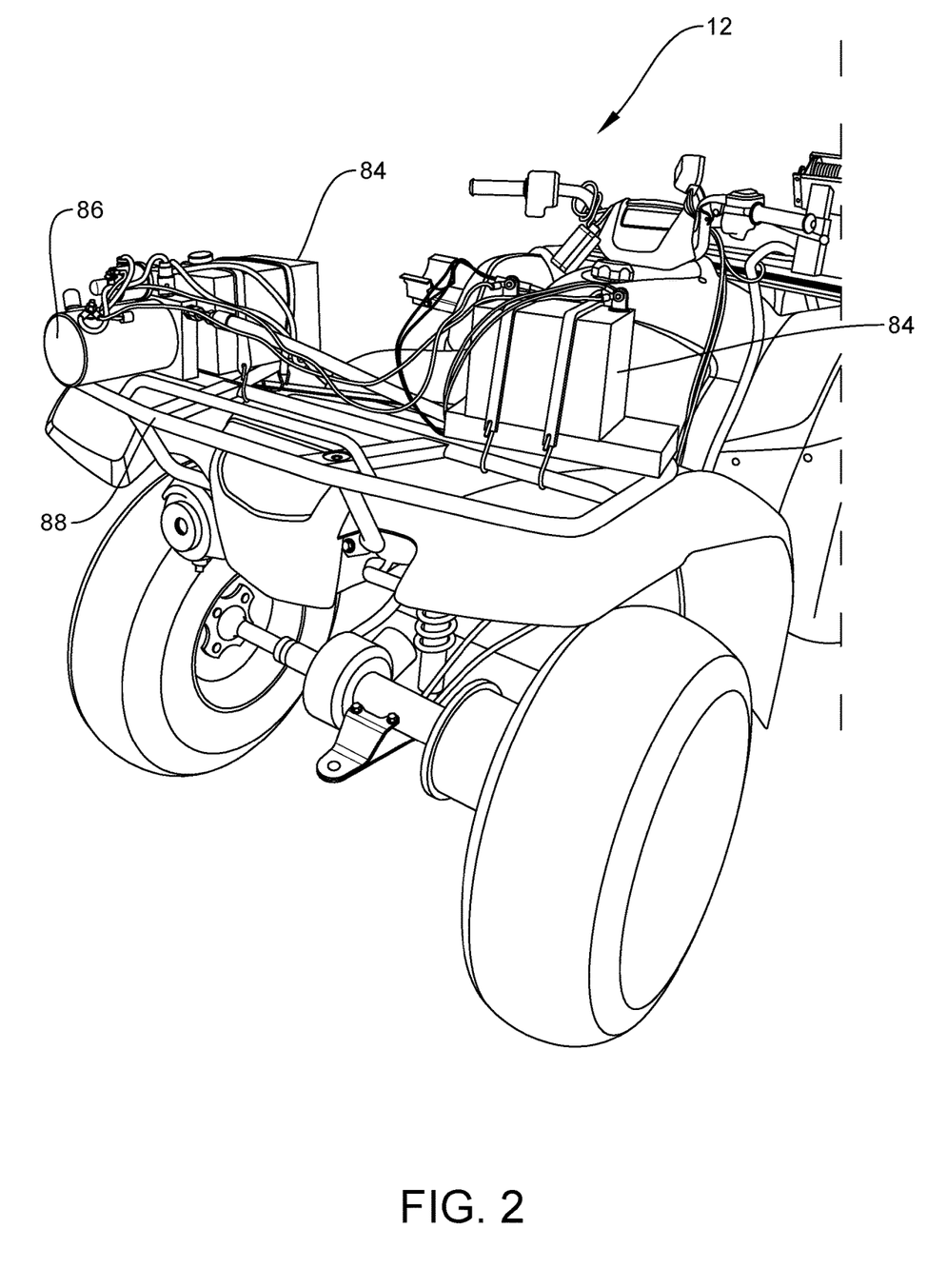
FIG. 2 is a rear perspective view of the ATV with a hydraulic pump and auxiliary batteries mounted on a back rack.

Auxiliary batteries 84 for powering winch 22 and a hydraulic pump 86 for powering hydraulic cylinder 20 through conventional hydraulic hoses may be mounted on a back rack 88 of the ATV as shown in FIG. 2. Controls are provided within reach of the driver of ATV 12 for activating winch 22 and hydraulic cylinder 20.

In use, with support frame 16 mounted on the underside of ATV 12, with parallelogram linkage 18 mounted on platform 34 and collapsed, and with support frame 16 raised with winch 22, lifting device 10 may be driven into the field. Platform 36 may then be lowered slightly and parallelogram linkage 18 aligned with axle 78 such that saddles 76 are under the axle and on opposite sides of drive shaft motor 80. Winch 22 may then relax pull on pulleys 52 such that lower rail 6 is seated on the ground under axle 78. Hydraulic cylinder 20 may then be extended unfolding parallelogram linkage 18 into elevated position lifting tower 14 by axle 78 as shown in FIG. 6 and freeing wheels 82 from the ground for rotation into towing position. After wheels 82 on all of the towers have been rotated, the string may be towed to a new position. The towers are then lifted one by one with lifting device 10 and wheels 82 rotated back parallel to axle 78 such that irrigation may begin.

In view of the above, it will be seen that the object of the invention is achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A lifting device which can be attached to an all terrain vehicle (ATV) for lifting towable irrigation towers, each of said towers mounted on an axle with wheels that are movable between a first position perpendicular to the axle and a second position parallel with the axle, said axle having a drive shaft motor mounted on the axle for driving the wheels, said lifting device comprising: a support frame having parallel arms with a lug at a first end of each of said parallel arms for attachment to an underside of the ATV, a support platform attached at a second end of the arms, said support frame movable between a first position wherein the support frame is oriented parallel to ground and a second position wherein the support frame is lifted above the ground, a parallelogram linkage mounted on the support platform, said linkage having an upper rail and a lower rail and first and second support links, said first and second support links connected with pivots at opposite ends of each of the first and second support links to the upper and lower rails, a hydraulic cylinder connected between the upper and lower rails, said upper and lower rails formed of C-shaped channel steel and said support links formed of C-shaped channel steel with legs of the C-shaped channel support links pivoted between legs of the C-shaped channel rails, the hydraulic cylinder with a base end and a pivot end connected with first and second pivot mounts between the upper and lower rails, the first pivot mount positioned adjacent to and spaced inward from the first support link connected to the lower rail and the second pivot mount positioned adjacent to and spaced inward from the second support link connected to the upper rail, first and second C-shaped saddles on the upper rail for cupping the axle of the tower and spaced apart a distance sufficient to accommodate the drive shaft motor; said parallelogram linkage movable by the hydraulic cylinder between a first position wherein the upper rail is below the axle of the tower so that the lifting device may be positioned below the axle and a second position wherein the upper rail is parallel to the lower rail and spaced a distance by the first and second support links above the lower rail sufficient that the C-shaped saddles raise the axle of the tower a distance that the wheels of the tower are lifted above the ground and may be rotated; and a winch mounted on the ATV with a cable attached to the support frame operable for moving the support frame between the first and second positions.

2. The lifting device of claim 1 further including a suspension limiter for stopping movement of the support frame in a direction of the second position of the support frame such that support frame does not contact the underside of the ATV.

3. The lifting device of claim 2 wherein the suspension limiter comprises a vertical guide rod attached to the platform and passed through an aperture in a bracket attached to the all terrain vehicle, a compression spring wrapped around the guide rod and sandwiched between the support platform and a collar which is free to slide on the guide rod until the collar contacts an underside of the bracket, said support platform and the collar forming pressure plates at opposite ends of the compression spring, the movement of the support frame is stopped when the compressive force on a compression spring exceeds a pulling power of the winch.

4. A lifting device which can be attached to an all terrain vehicle (ATV) for lifting towable irrigation towers, each of said towers mounted on an axle with wheels that are movable between a first position perpendicular to the axle and a second position parallel with the axle, said axle having a drive shaft motor mounted on the axle for driving the wheels, said lifting device comprising: a support frame having parallel arms, each said parallel arm is pinned or bolted at a first end to a clevis attached to an underside of the ATV, a support platform attached at a second end of the parallel arms, said support frame movable between a first position wherein the support frame is oriented parallel to ground and a second position wherein the support frame is lifted above the ground, a parallelogram linkage mounted on the support platform, said linkage having an upper rail and a lower rail and first and second support links, said first and second support links connected with pivots at opposite ends of each of the first and second support links to the upper and lower rails, a hydraulic cylinder connected between the upper and lower rails, the hydraulic cylinder with a base end and a pivot end connected with first and second pivot mounts between the upper and lower rails, the first pivot mount positioned adjacent to and spaced inward from the first support link connected to the lower rail and the second pivot mount positioned adjacent to and spaced inward from the second support link connected to the upper rail, first and second C-shaped saddles on the upper rail for cupping the axle of the tower and spaced apart a distance sufficient to accommodate the drive shaft motor; said parallelogram linkage movable by the hydraulic cylinder between a first position wherein the upper rail is below the axle of the tower so that the lifting device may be positioned below the axle and a second position wherein the upper rail is parallel to the lower rail and spaced a distance by the first and second support links above the lower rail sufficient that the C-shaped saddles raise the axle of the tower a distance that the wheels of the tower are lifted above the ground and may be rotated; a winch mounted on the ATV with a cable attached to the support frame operable for moving the support frame between the first and second positions, said cable with an end attached to the ATV and passing through first and second pulleys mounted on the support platform; and a suspension limiter for stopping movement of the support frame in a direction of the second position of the support frame such that the support frame does not contact the underside of the ATV.

5. The lifting device of claim 4 wherein the suspension limiter comprises a vertical guide rod attached to the platform and passed through an aperture in a bracket attached to the all terrain vehicle, a compression spring wrapped around the guide rod and sandwiched between the platform and a collar which is free to slide on the guide rod until the collar contacts an underside of the bracket, said platform and the collar forming pressure plates at opposite ends of the compression spring, the movement of the support frame is stopped when a compressive force on the compression spring exceeds a pulling power of the winch.

6. The lifting device of claim 5 wherein the parallelogram linkage in the first position has a height of 10 inches and a height of 33 inches in the second position.

7. A lifting device which can be attached to an all terrain vehicle (ATV) for lifting towable irrigation towers, each of said towers mounted on an axle with wheels that are movable between a first position perpendicular to the axle and a second position parallel with the axle, said axle having a drive shaft motor mounted on the axle for driving the wheels, said lifting device comprising: a support frame having parallel arms with a lug at a first end of each of said parallel arms for attachment of the arm to an underside of the ATV, a support platform attached at a second end of each of the parallel arms, said support frame movable between a first position wherein the support frame is oriented parallel to ground and a second position wherein the support frame is lifted above the ground, a parallelogram linkage mounted on the support platform, said linkage having an upper rail and a lower rail and first and second support links, said first and second support links connected with pivots at opposite ends of each of the first and second support links to the upper and lower rails, a hydraulic cylinder connected between the upper and lower rails, said upper and lower rails formed of C-shaped channel steel and said support links formed of C-shaped channel steel with legs of the C-shaped channel support links pivoted between legs of the C-shaped channel rails, the hydraulic cylinder with a base end and a pivot end connected with first and second pivot mounts between the upper and lower rails, the first pivot mount positioned adjacent to and spaced inward from the first support link connected to the lower rail and the second pivot mount positioned adjacent to and spaced inward from the second support link connected to the upper rail, first and second C-shaped saddles on the upper rail for cupping the axle of the tower and spaced apart a distance sufficient to accommodate the drive shaft motor; said parallelogram linkage movable by the hydraulic cylinder between a first position wherein the upper rail is below the axle of the tower so that the lifting device may be positioned below the axle and a second position wherein the upper rail is parallel to the lower rail and spaced a distance by the support links above the lower rail sufficient that the C-shaped saddles raise the axle of the tower a distance that the wheels of the tower are lifted above the ground and may be rotated; a winch mounted on the ATV with a cable attached to the support frame operable for moving the support frame between the first and second positions; a suspension limiter for stopping movement of the support frame in a direction of the second position of the support frame such that the support frame does not contact the underside of the ATV; and auxiliary batteries for powering the winch and a hydraulic pump for powering the hydraulic cylinder mounted on a back rack of the ATV.

8. The lifting device of claim 7 wherein the suspension limiter comprises a vertical guide rod attached to the platform and passed through an aperture in a bracket attached to the all terrain vehicle, a compression spring wrapped around the guide rod and sandwiched between the support platform and a collar which is free to slide on the guide rod until the collar contacts an underside of the bracket, said support platform and the collar forming pressure plates at opposite ends of the compression spring, the movement of the support frame is stopped when a compressive force on the compression spring exceeds a pulling power of the winch.

\* \* \* \* \*